United States Patent
Doshi et al.

(10) Patent No.: US 12,314,178 B2
(45) Date of Patent: May 27, 2025

(54) MANAGEMENT OF DISTRIBUTED SHARED MEMORY

(71) Applicant: Intel Corporation, Santa Clara, CA (US)

(72) Inventors: Kshitij A. Doshi, Tempe, AZ (US); Francesc Guim Bernat, Barcelona (ES); Suraj Prabhakaran, Aachen (DE); Tushar Sudhakar Gohad, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 659 days.

(21) Appl. No.: 17/344,763

(22) Filed: Jun. 10, 2021

(65) Prior Publication Data

US 2021/0303477 A1    Sep. 30, 2021

Related U.S. Application Data

(60) Provisional application No. 63/130,664, filed on Dec. 26, 2020.

(51) Int. Cl.
*G06F 12/08* (2016.01)
*G06F 12/0813* (2016.01)
(Continued)

(52) U.S. Cl.
CPC ...... *G06F 12/0813* (2013.01); *G06F 12/1009* (2013.01); *H04L 41/0893* (2013.01)

(58) Field of Classification Search
CPC ...... G06F 12/109; G06F 9/00; G06F 12/0882; G06F 12/0817; G06F 12/0813;
(Continued)

(56) References Cited

U.S. PATENT DOCUMENTS 5,822,773 A * 10/1998 Pritchard ............ G06F 3/0679
                                                          711/162
7,949,737 B2 * 5/2011 Tan .................... H04L 61/50
                                                          709/201
(Continued)

FOREIGN PATENT DOCUMENTS

EP          0308047 A2 *  3/1989
KR     1020130048594 A    5/2013
(Continued)

OTHER PUBLICATIONS

H. Jonathan Chao; Bin Liu, "HighSpeed Router Chip Set," in High Performance Switches and Routers , IEEE, 2007, pp. 538-605, ch16.*

(Continued)

*Primary Examiner* — Pierre Michel Bataille
(74) *Attorney, Agent, or Firm* — Compass IP Law PC

(57) ABSTRACT

Examples described herein relate to a network interface device. In some examples, the network interface device includes a device interface; input/output circuitry to receive Ethernet compliant packets and output Ethernet compliant packets; circuitry to monitor a particular page for a rate of data copying among nodes within a group of two or more nodes; and circuitry to perform one or more actions based, at least in part, on the rate of data copying among the nodes within the group of two or more nodes to attempt to reduce a number of copy operations of the data among the nodes within the group of two or more nodes, wherein the group of two or more nodes are part of a distributed shared memory (DSM).

18 Claims, 9 Drawing Sheets

(51) Int. Cl.
*G06F 12/1009* (2016.01)
*H04L 41/0893* (2022.01)

(58) Field of Classification Search
CPC ............. G06F 12/1009; G06F 12/0284; G06F 12/0811; G06F 2212/154; G06F 2212/1041; G06F 2212/502; G06F 12/0804; G06F 2212/1016; G06F 2212/651; G06F 12/0862; G06F 2212/1048; H04L 67/568; H04L 41/0893; H04L 43/0876

See application file for complete search history.

(56) References Cited

U.S. PATENT DOCUMENTS

| | | | |
|---|---|---|---|
| 2001/0047460 A1* | 11/2001 | Kobayashi | G06F 11/2066 709/250 |
| 2002/0144058 A1* | 10/2002 | Burger | G06F 11/2074 714/E11.107 |
| 2009/0257386 A1* | 10/2009 | Achir | H04L 25/14 370/329 |
| 2012/0272029 A1 | 10/2012 | Zhang et al. | |
| 2014/0082308 A1* | 3/2014 | Naruse | G06F 3/0689 711/158 |
| 2014/0136773 A1 | 5/2014 | Michalak | |
| 2014/0156777 A1 | 6/2014 | Subbiah et al. | |
| 2015/0370702 A1* | 12/2015 | Voigt | G06F 13/404 711/2 |
| 2018/0006923 A1 | 1/2018 | Gao et al. | |
| 2018/0365167 A1* | 12/2018 | Eckert | G06F 12/1036 |
| 2020/0349074 A1* | 11/2020 | Kucherov | G06F 3/0619 |
| 2022/0091738 A1 | 3/2022 | Patil et al. | |
| 2022/0164118 A1* | 5/2022 | Hsu | G06F 11/3476 |

FOREIGN PATENT DOCUMENTS

| | | | | |
|---|---|---|---|---|
| WO | WO-2016070302 A1 * | 5/2016 | .......... | G06F 11/1658 |
| WO | WO-2020231467 A1 * | 11/2020 | .......... | G06F 11/3037 |

OTHER PUBLICATIONS

C. Scheurich and M. Dubois, "Dynamic page migration in multi-processors with distributed global memory," in IEEE Transactions on Computers, vol. 38, No. 8, pp. 1154-1163, Aug. 1989.*

D. S. Nikolopoulos, T. S. Papatheodorou, C. D. Polychronopoulos, J. Labarta and E. Ayguade, "Is Data Distribution Necessary in OpenMP?," SC '00: Proceedings of the 2000 ACM/IEEE Conference on Supercomputing, Dallas, TX, USA, 2000, pp. 47-47.*

Amza, Cristiana, et al., "TreadMarks: Shared Memory Computing on Networks of Work-stations", IEEE Computer, Feb. 1995, 26 pages.

Ibel, Maximilian et al., "High-Performance Cluster Computing Using SCI. Hot Interconnects", Aug. 1997 13 pages.

Itzkovitz, Ayal et al., "Millipede: a User-Level NT-Based Distributed Shared Memory System with Thread Migration and Dynamic Run-Time Optimization of Memory References", USENIX Windows NT Workshop, Aug. 1997, 2 pages.

Jiang, Dave, "Introducing the Intel® Data Streaming Accelerator (Intel® DSA)", https://01.org/blogs/2019/introducing-intel-data-streaming-accelerator, Nov. 2019, 5 pages.

Keleher, Pete et al., "TreadMarks: Distributed Shared Memory on Standard Workstations and Operating Systems", USENIX Winter 1994, 17 pages.

Koch, Povl T. et al., "Global Management of Coherent Shared Memory on an SCI Cluster", https://www.researchgate.net/publication/2578306_Global_Management_of_Coherent_Shared_Memory_on_an_SCI_Cluster, Dec. 1999, 7 pages.

Kumar, Akhilesh, "New Intel® Mesh Architecture: The 'Superhighway' of the Data Center", Intel, White Paper, Apr. 2020, 3 pages.

Paas, Sven M. et al., "Computing on a Cluster of PCs: Project Overview and Early Experiences", CSR-97-05 Chemnitzer Informatik-Berichte, Winter 1997. 13 pages.

Speight, Evan and Bennett, John K., "Brazos: A Third Generation DSM System", First USENIX Windows NT Workshop, Aug. 1997, 13 pages.

International Search Report and Written Opinion for PCT Patent Application No. PCT/US21/51794, Mailed Jan. 3, 2022, 8 pages.

* cited by examiner

MANAGEMENT OF DISTRIBUTED SHARED MEMORY

RELATED APPLICATION

This application claims priority to U.S. Provisional Application No. 63/130,664, filed Dec. 26, 2020. The entire contents of that application is incorporated by reference in its entirety.

BACKGROUND

FIG. 1 depicts a multi-machine, distributed shared memory (DSM) architecture in which applications execute on various processors (P1, . . . Pn) and access shared memory, while the accessed data is physically distributed across local memories (M1, . . . Mn) and over a scale-out network. DSMs are widely used in datacenter based public or private clouds to highly decentralized edge computing solutions. For example, if processor P1 performs an operation on a page of data, DSM can cause processor P2 to invalidate that page and allow processor P1 to "own" data (e.g., exclusive access state or write state) associated with virtual memory. If processor P3 is to read the page of data, P1 can reduce ownership from exclusive or write to shared and permit processor P1 to access data in shared memory and to request processor P1 for a copy of the data. DSM can perform cache and home agent (CHA) operations at a page granular level over network.

DSMs can be implemented in software that do not mandate particular interconnects, custom memory controllers, and specialized platform software and firmware. In a DSM, a scale-out cluster is accessible to applications as a shared memory. However, even using remote direct memory access (RDMA), latency differences between local and remote memory accesses can be apparent. Caching of remote data in a memory local to a node and accessible through a device interface can achieve acceptable performance. Using commercial-off-the-shelf (COTS) hardware, in some cases, DSMs can implement coarse-grained consistency mechanisms for page sized data. DSMs can be subject to unpredictable page access patterns due to data-dependent accesses and due to operations that cause different frequently accessed ("hot") pages to be copied between nodes. In some DSMs, which are implemented in software, the fabric and network interface card (NIC) copy pages back and forth among the different nodes according to access patterns that arise. When these accesses from inside different nodes access different cache lines in the same pages, these pages may be copied back and forth between nodes. These patterns, are in general, not known at application development or compile time. DSMs can reduce a size of a page to reduce a probability of excessive page copying. However, that can lead to more network messages with corresponding increase in network bandwidth usage.

Monitoring of whether an access is occurring to a DSM page can be implemented on a variety of different network protocols such as sockets, OpenFabrics Interfaces (OFI), using Transmission Control Protocol (TCP), Datagram Transport Layer Security (DTLS), Hypertext Transfer Protocol Version 2 (HTTP/2), Google Remote Procedure Call (gRPC), zeroRPC, and so forth. In some cases, to monitor page accesses, an application and/or operating system (OS) can implement page read or write interception using a protection fault through RDMA accesses.

Generally, after performance issues are diagnosed (e.g., using trace analysis), applications may be tuned so that an application may mitigate excessive or reduce data copying through prefetching, function and data decompositions, operation schedule altering, and so forth. However, it can be laborious to troubleshoot performance issues and issues identified and mitigated, application by application, and, potentially, configuration by configuration.

DETAILED DESCRIPTION

Figure 1:
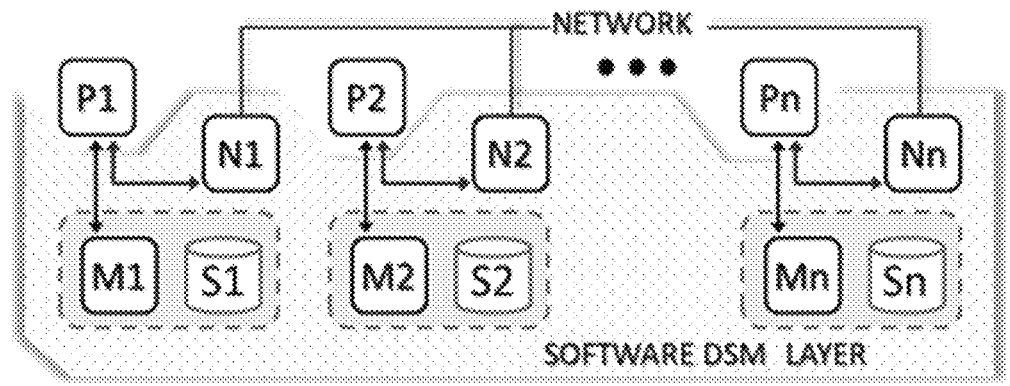
FIG. 1 depicts a multi-machine, distributed shared memory (DSM) architecture

A network device (e.g., one or more of a SmartNIC, infrastructure processing unit (IPU), switch, switch with programmable packet processing pipeline (including match-action units)), and/or host may (a) identify a DSM data copy to and from different memory devices (whether the same two memory devices or different memory devices at the same or different node) and, based, at least, in part on whether the data is copied excessively to or from a node, (b) adjust what data is copied, when the data is copied, and to what node the data is copied to or from. A node can be associated with a logical address (e.g., internet protocol (IP) address), container, or virtual machine (VM)). A node can include a circuit board with one or more processors, one or more network interfaces, one or more caches, and/or one or more memory devices. A network device can determine which memory pages (or other sizes of stored data) that are copied between different DSM caches. A network device can determine an amount of bandwidth used to copy data between a set of nodes to determine a transmission rate of data between nodes. A network device can perform analytics (e.g., at an edge node and/or other location) to copy data closer to the one or more nodes where the data will be accessed to attempt to reduce a number of data copying operations, an amount of memory used to store data, and/or an amount of bandwidth used to transmit data. A network device can be used by services that are decomposed into different containers (e.g., microservices or function as a service (FaaS) functions) and distributed flexibly at deployment.

One or more network devices can discover when page copying levels are sufficiently high and identify causes of high levels of page copying. One or more network devices can detect time ranges and memory address ranges (e.g., page or sub-page) where excessive page transfers or copies occur at least in the context of DSM operations. One or more network devices can associate time ranges or windows with memory address ranges where page transfers arise and associate them with handles or identifiers to determine a frequency of page transfers, source and destination node, and/or bandwidth used to transfer data. One or more network devices can identify nodes (and processes) where the data copies occur more often and one or more network devices and/or applications can use this information to alter location of application, services, or function execution and data placements across the nodes, either through live migration or in future executions. One or more network devices can perform actions associated with a particular detected scenario. An example action can include creating multiple data replicas and merge them periodically, thus deferring a data merge and/or data recovery to a later point of time.

One or more network devices can communicate with a CPU as between a CPU core and another CPU core or a GPU core. One or more network devices can act as an out-of-band observer of memory accesses to data or cached data in a DSM. One or more network devices can monitor accesses to pages of interest and the one or more network devices can inform software (e.g., application or orchestrator) when accesses of interest or combinations of accesses of interest are detected locally and/or across nodes (and what nodes). Time stamps or time windows can be used to identify when accesses of interest or combinations of accesses of interest are detected locally and/or across nodes. Accordingly, one or more network devices can monitor when particular nodes access the same data from a DSM, on a coordinated basis among the nodes. Software can utilize various control operations and conditionalities so that reductions in data copying can be performed directly at the one or more network devices to select software mitigation operations.

A cluster of two or more network devices may reduce copying of data from node to node. One or more network devices can monitor data copying so that instruction sets that cause frequently copied or "bouncing" pages may be grouped and, to reduce bandwidth used to copy data, frequently copied pages can be co-located at the same node, or among nodes that are proximal (e.g., 1 or fewer hops away from each other, allocated more bandwidth because they are in the same local group, etc.). Frequently copied pages can be identified as pages where a number of copies to another node in a group of two or more nodes exceeds a threshold value. In some other cases, data structure and instruction set changes can be made to reduce a number or frequency of data copies or data accesses such as splitting up frequently accessed data across different DSM pages. Page de-duplication can be performed to reduce data transfer rates and an amount of memory used to store data.

Processor-executed software can offload monitoring and remediation for page accesses in a node to a network device. In some examples, passive updates in memory that arrive as a result of writebacks, RDMA operations and so forth do not cause notification to software executing on the CPUs, GPUs, and so forth, because the network device is in the path for these operations at the hardware level. A network device can collect statistics and alert software for particular cases where software is to be alerted. A network device can limit an amount of interruptions to CPU-executed software, and an amount of cache pollution and memory bandwidth usage, for data that is not of immediate interest to the CPUs, GPUs, XPUs, and so forth.

Figure 2:
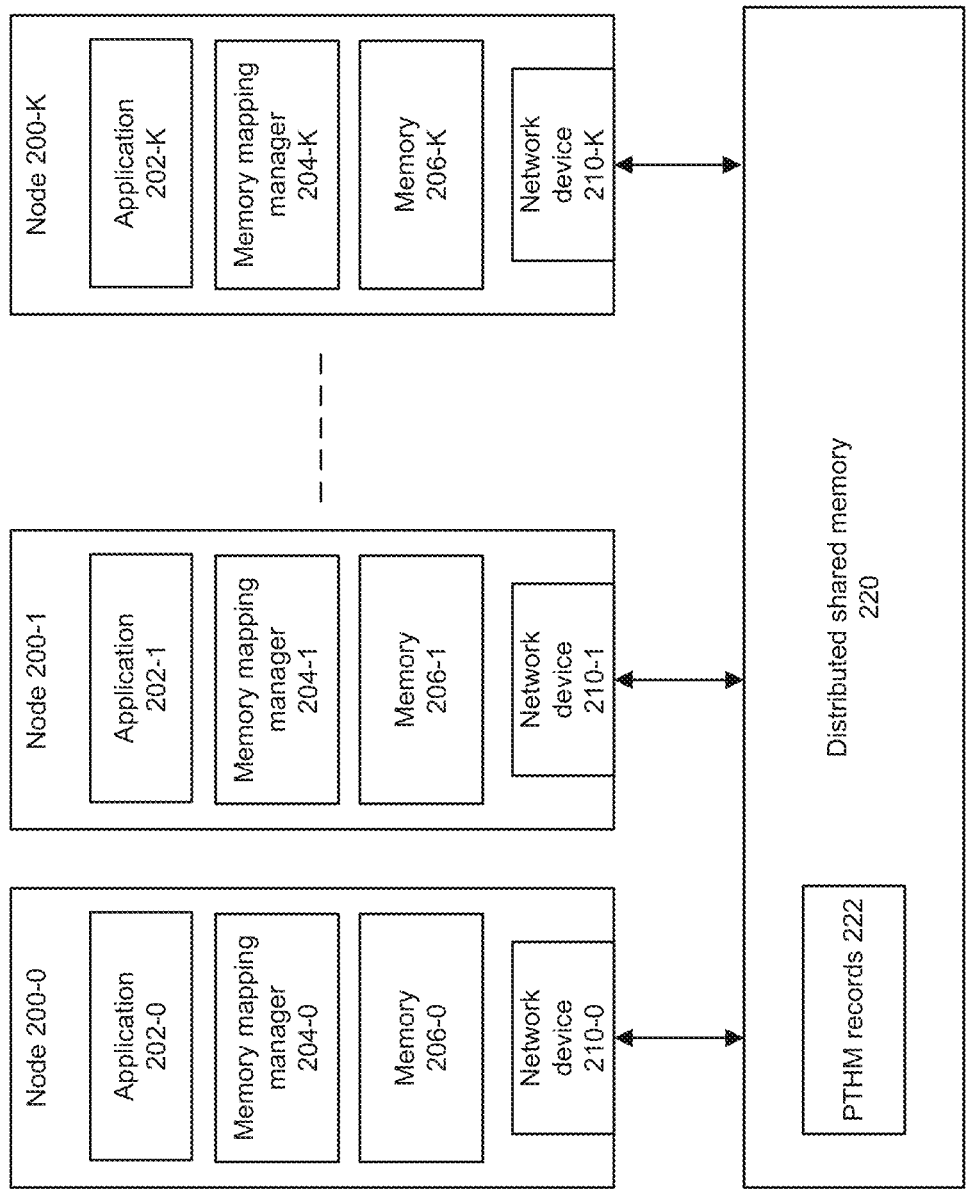
FIG. 2 depicts an example system.

FIG. 2 depicts an example system. One or more of applications 202-0 to 202-K can read data from or write data to a respective local memory 204-0 to 204-K via a device interface and/or read data from or write data to DSM 220 using respective network device 210-0 to 210-K. One or more of memory mapping managers 204-0 to 204-K can monitor locations in which memory regions are being stored (e.g., local memory 204-0 to 204-K and/or DSM 220). One or more network devices 210-0 to 210-K (K is an integer of 2 or more) may store data, instructions, or state used to monitor frequency of accesses to data in DSM 220. A size of monitored data can be a page, although other sizes can be used. For example, a page of data can be 4096 bytes, 8192 bytes, or other sizes. State can include page-transfer heat map (PTHM) 222. An orchestrator, hypervisor, OS, driver, and/or application program interface (API) for one or more network devices 210-0 to 210-K can allow application 202-0 to 202-K (e.g., DSM layer and/or software stack library) to offload to network device 210-0 to 210-K identification of data copying operations with various tokens or identifiers. Using tokens or identifiers, one or more network devices 210-0 to 210-K can identify various address range data copy operations to a target of a remote access. On the basis of these matches, one or more network devices 210-0 to 210-K can update page-transfer counters, associated tokens, and time indices in PTHM 222. Data copy operations can be statistical such that their heatmap updates need not be absolutely precise or synchronized, so long as they are approximately close to the truth.

For example, PTHM 222 can be used for collecting statistical indicators of various patterns of access, at a fine granularity but without synchronization or ordering with respect to DSM operations. A size of PTHM 222 can grow very slowly with respect to the overall DSM capacity and grow linearly with a number of nodes in DSM 220. For example, DSM 220 can include one or more memory devices, persistent memory devices, storage connected via a circuit board, fabric or network. One or more network devices 210-0 to 210-K can collect information about DSM accesses (e.g., read, write, and/or copy) in a coordinated manner across the nodes and organize that information in PTHM 222. For one or more data pages, one or more network devices 210-0 to 210-K can evaluate an estimated data transfer rate for that page and/or number of copies of that page over a time span and retrieve a recent set of tokens associated with the target page. If collected over every page in a DSM, such information can become large in volume. A space efficient hash can be used whose distributivity is controllable. With control over hashing, token insertion and collection software can determine a precise cause of copying of pages from one node to another node (e.g., ping-pongs), where the copying of pages can occur between two or more nodes.

For example, for a particular token, node, or access target address, false positives can be disallowed in the hash. Checkpoint of a local PTHM state can be synchronously performed into storage and notification (e.g., passive notification) of other nodes can occur through node-specific DSM pages for memory-based notifications. A node can monitor notifications and log their local PTHM views into storage and avoid a barrier.

One or more network devices 210-0 to 210-K can support filtering driven control actions or match-action operations by which one or more network devices 210-0 to 210-K can automatically notify software and notify other one or more network devices 210-0 to 210-K when a monitored event occurs or perform a corrective action, as described herein. For example, for various dynamically identified pages that are identified as having a high number of copies in the page transfer heat map, such as higher than a threshold number of copies, one or more network devices 210-0 to 210-K can slice or segment, de-duplicate, or merge such pages. Based on occurrence of a condition, one or more network devices 210-0 to 210-K may precipitate a remedial action or action so that more extensive data collection can be undertaken by software executed by a processor in a node, while one or more network devices 210-0 to 210-K can record copy operations or access (e.g., read or write) operations in PTHM 222. The arrangement may permit a rapid extraction, from assistive layers in DSM, of times when various pages are found to bounce rapidly between nodes.

For pages that are accessed below certain frequency, a data consistency scheme can be used by one or more network devices 210-0 to 210-K. For pages that are accessed (e.g., copied, read, or written-to) above a threshold number of times over a period of time, one or more network devices 210-0 to 210-K can copy the pages to one or more nodes that access the data the most and/or second to most and so forth. For pages that are accessed above a threshold number of times over a period of time, a particular node that accesses the data the most or its network device can become a coordinator of changes to the pages and updates to the pages can be sent to the coordinator node so that the coordinator node makes changes to the page, holds latest copy of page as a true copy, and other nodes access a true or most-up-to-date copy of the page from the coordinator node.

Local copies of an unmodified page at a node can be marked as read-only in their page table permissions, even though logically the page is writable. When application code attempts to write to the page, that write is supposed to succeed, but it faults because of the lack of write permissions at the hardware level. At that point, the writing process is stalled, and the DSM commands other nodes to invalidate their copies of the page. Instead of making a current copy of a page writable, a new copy can be created and an old copy retained by the DSM so that the DSM can use that copy. The DSM can submit that old copy into a rolling checkpoint which may be in progress so the old (pre-write) copy of the page is reflected into a checkpoint in a snapshot consistency model. When the write is complete and also the checkpoint is also done, the old copy of the page can be discarded. A page can be unlikely to be written at one node and simultaneously be in read-use at some other node. Copy-on-write (CoW) protecting the page produces unnecessary faults because it is a form of premature protection. Some examples can allow non-use of CoW-protection by having the network device observe that a page is not present in another node and not set up a write-fault to trap writes.

For example, one or more network devices 210-0 to 210-K can be configured to trigger a mitigating or remedial action described herein based on occurrence of one or more of: (a) total number of page transfers in last 10 milliseconds exceeds 1 million on one or more nodes, (b) a total number of page transfers in last 5 milliseconds exceeds 1 thousand on one or more DSM data pages across one or more nodes, and/or (c) a number of copy-on-write (CoW) breaking faults across DSMs, across pages, in the last 50 milliseconds exceeds 0.5 million.

For example, one or more network devices 210-0 to 210-K can be configured to trigger a mitigating or remedial action described herein based on occurrence of one or more of: (1) a single token is associated with more than 10,000 page transfers, (2) more than 10,000 CoW faults occurred in a last 10 ms, and/or (3) a single token is associated with less than 100 page transfers or CoW faults on average. For example, one or more network devices 210-0 to 210-K can be configured to trigger a mitigating action described herein based on occurrence of identification of a token that is associated with a significant increase in a number of copy operations overall (e.g., a threshold exceeding increase of copy operations over a time period), or is prematurely CoW-protecting pages.

For example, for a data page D, a time index T, and a token set S, one or more network devices 210-0 to 210-K can may be queried by a network device, orchestrator, or other software to obtain a rate R of page transfers of D over last N time indexes (where N is configured by the DSM implementation by an orchestrator or application) ending at time index T and a token set S that is associated with D can be made available. A token set can be lossy in some examples if it captures a moving window of tokens that are associated with accesses to data page D. Counters in PTHM 222 can be hashed, and the hash can be distributive (e.g., Galois multiply). The hash can be computed over target page addresses where the page transfers occur. Hash records can contain time indexes when accesses and/or page state transitions occur, and a recent set of matching tokens and nodes that initiate access. The hash can allow conflicts and a hash entry may indicate that a page was subject of a transfer when it really was not (e.g., due to aliasing). A DSM layer (e.g., one or more of memory mapping managers 204-0 to 204-K and/or one or more of network devices 210-0 to 210-K) can determine which pages are actually transferred (e.g., by keeping a log). One or more network devices 210-0 to 210-K can monitor frequency of page transfers quickly and efficiently and filtering out false positives once the high hit rate items are identified can be performed in post processing in processor executed software. In the background, the shared PTHM records 222 (e.g., stored in DSM 220) can be updated asynchronously by one or more network devices 210-0 to 210-K.

One or more network devices 210-0 to 210-K, one or more of applications 202-0 to 202-K and/or the DSM runtime can associate tokens with various data, so that software can obtain a collection of recent tokens back, and thus trace a history of accesses or combinations of accesses that produce a threshold meeting or exceeding level of copy rate to their causes, or other activities that may be correlated with token sets. An application can include one or more of: a virtual machine (VM), container, service, microservice, binary executable, and so forth. Transitions on page states (e.g., from writable, to copy-on-write, to invalidated, can be recorded into PTHM 222 along with accesses (e.g., nodes, tokens) that cause them, and the time indexes when they occur. Applications and/or DSM runtime can direct one or more network devices 210-0 to 210-K through primitives and filters so that one or more network devices 210-0 to 210-K can monitor for conditions.

If a node does not use one or more network devices 210-0 to 210-K that can perform page access monitoring and/or corrective actions offloaded from an application or DSM layer or runtime, then a CPU-executed software on a node can perform page access monitoring and/or corrective actions and/or cause another one of one or more network devices 210-0 to 210-K to can perform page access monitoring and/or corrective actions. Note that reference to page access monitoring can refer interchangeably with address range access including sub-page accesses.

Some nodes may utilize legacy NICs, such as a NIC that cannot perform page access monitoring and/or corrective actions, and not offload monitoring and/or remediation to a legacy NIC. One or more network devices 210-0 to 210-K can identify a subset of pages copied more than a threshold number of times and make them known to nodes in a group, including nodes that use legacy NICs. A host can perform remediations for those pages that have been identified by one or more network devices 210-0 to 210-K that perform monitoring and/or remediation. Host-executed software (emulating nodes) may perform pseudo-random sampling to select pages in a DSM region to determine one-sided operations (e.g., RDMA) or write-back operations. Thus, a subset of DSM pages can be identified that are copied back and forth between multiple nodes. Over time, emulating nodes can have the same coverage (statistically) that one or more network devices 210-0 to 210-K that perform monitoring and/or remediation can produce.

Figure 3:
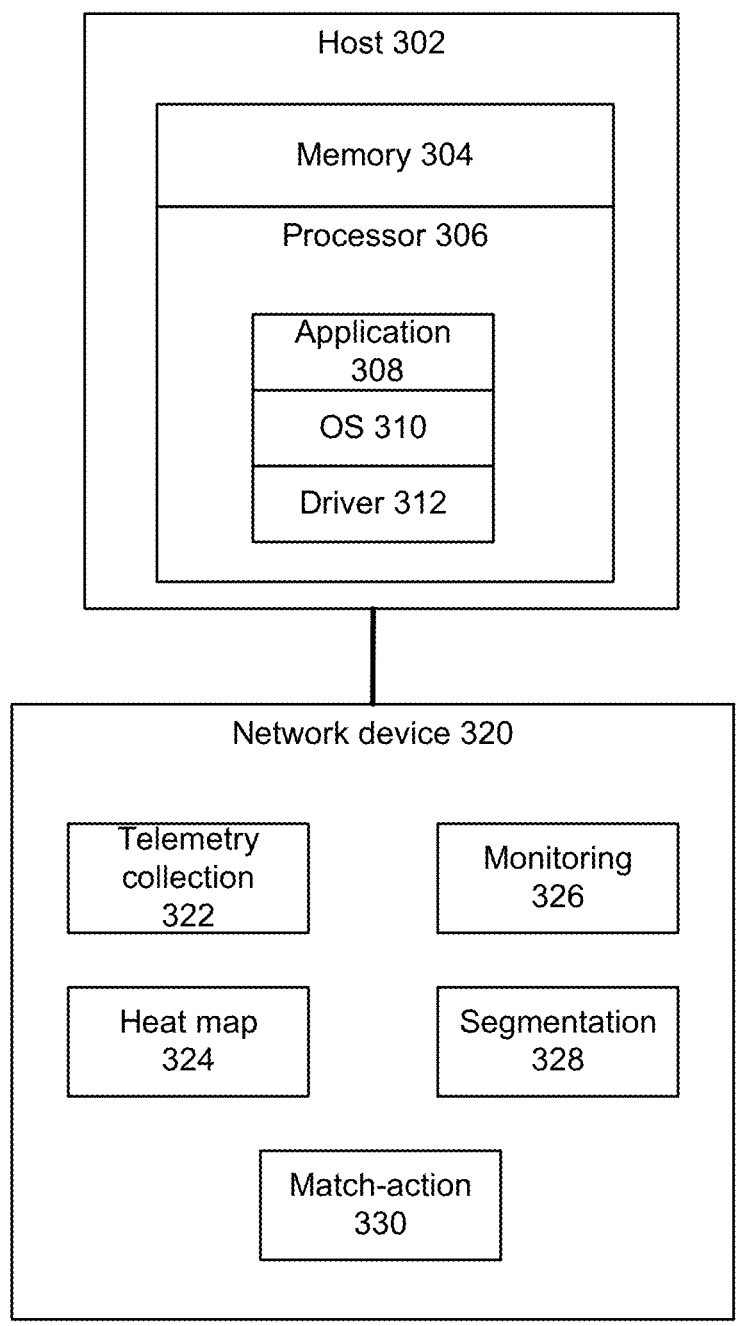
FIG. 3 depicts an example system.

FIG. 3 depicts an example system. Host 302 can include at least a memory 304 and processor 306. Processor 306 can execute application 308, OS 310, and driver 312. OS 310 and/or driver 312 can permit application 308 to offload to network device 320 monitoring and management of data copies within a DSM to attempt to reduce data copy operations. OS 310 or driver 312 can enable or disable network device 320 to monitor page copy operations and perform one or more remediation actions described herein.

Monitoring circuitry 326 can be configured to perform monitoring of a range of addresses (e.g., virtual or physical addresses of a page or sub-page or across multiple pages) in one or more memory devices in a DSM. Telemetry collection circuitry 322 can collect frequency of copies of data in one or more address ranges between nodes in a DSM. Telemetry collection circuitry 322 can store the frequency of copies of data information in a heat map data structure 324. Heat map data structure 324 can be stored in memory of network device 320 and/or a node of a DSM for access by other network devices. Segmentation circuitry 328 can perform segmentation of page data into smaller segments, such as less than a page size (e.g., half, third, or fifth, and so forth). Match-action circuitry 330 can identify conditions and perform remediation actions. Various mitigation or remediation actions can be applied for identified conditions such as, but not limited to, performing write-through caching for frequently copied pages, deduplication of sequences of frequently copied pages, not permitting copying of data between nodes so that data is fixed at a particular node, streaming pages frequently copied to multiple replicas proactively, maintaining a directory for frequently copied pages so that updates to frequently copied pages are propagated as write-through multicasts while updates to other pages are treated as writebacks to their respective home locations. Write-through caching can occur when data updated in a cache is also stored in an associated data source prior to completion of an operation.

Monitoring circuitry 326 can monitor at the network edge or other locations (e.g., top of rack (ToR), middle of rack, or end of row) flow of accesses to DSM pages from remote nodes to identify a frequency of specific page copies among nodes. When enabled by an OS or driver, among others, monitoring circuitry 326 can monitor page accesses made by one or more nodes. Using telemetry information collected by telemetry collection circuitry 322, monitoring circuitry 326 can access logs and identify frequently accessed pages and take further monitoring actions and match-action circuitry 330 can perform one or more remediation actions. A remediation action can include modifying data storage or sharing, including but not limited to repartitioning data among nodes. For example, as pages are copied from a shared memory, telemetry collection circuitry 322 can store the page indexes in local memory in a page-transfer heat map data structure 324. Telemetry collection circuitry 322 can utilize one or more hash functions for the gathered statistics. For a page transferred to another node, a counter for that page can be incremented and the access details stored in a log/storage in a shared memory in DSM. A page transfer can be identified using system telemetry, for example, by network device 320 storing the physical addresses of each loaded page and identifying when it is transferred to another node. For a counter that reaches a particular threshold value, information about that page such as node accesses can be obtained from telemetry collection circuitry 322 and stored in local and/or shared storage. Other network devices can access information about the page for consistent logging and association of pages and information obtained across multiple nodes.

The following provides an example of a format of page access information or page-transfer heat map.

| Loaded page identifier | Count of times copied to another node | Identifiers of nodes between which copies are made |
| --- | --- | --- |
| 0000x0000 | 1000 | 0000, 0010 |
| 0000x0001 | 3000 | 1000, 0010 |
| . . . | . . . | . . . |

Match-action circuitry 330 can be configured by application 308, OS 310, and/or driver 312 with various ranges of memory addresses of interest. Match-action circuitry 330 can manage one or a few ranges of addresses as of interest, and ignore other ranges where such statistics indicate rates are of low or no interest. Accordingly, some telemetry gathering and analysis may not be performed by network device 320 for regions of memory that are not programmed to be of interest.

In some examples, segmentation circuitry 328 of network device 320 may enter a mitigation mode, where segmentation circuitry 328 breaks up frequently accessed (hot) pages (e.g., 64K) into smaller page units (e.g., 4K) and monitors and transfers page units at the smaller granularity. In some examples, segmentation circuitry 328 can segment large frequently accessed DSM pages (e.g., 64K) into smaller page units (e.g., 4K) for monitoring. For frequently accessed (hot) pages, invaliding copies at a configurable time period can reduce a number of synchronous invalidation messages. In other words, network device 320 that receives a hot DSM page from a remote node can proactively perform a local DSM map invalidation so that the number of synchronous invalidations can be reduced.

In some cases, page copy monitoring and remediation can be implemented in software executed by a host processor where a legacy NIC is used that is not capable to perform offloaded page copy monitoring and remediation. Accordingly, software executed on a processor (e.g., CPU, GPU, XPU, accelerators, and so forth) can perform selected operations described with respect to FIG. 3.

Figure 4:
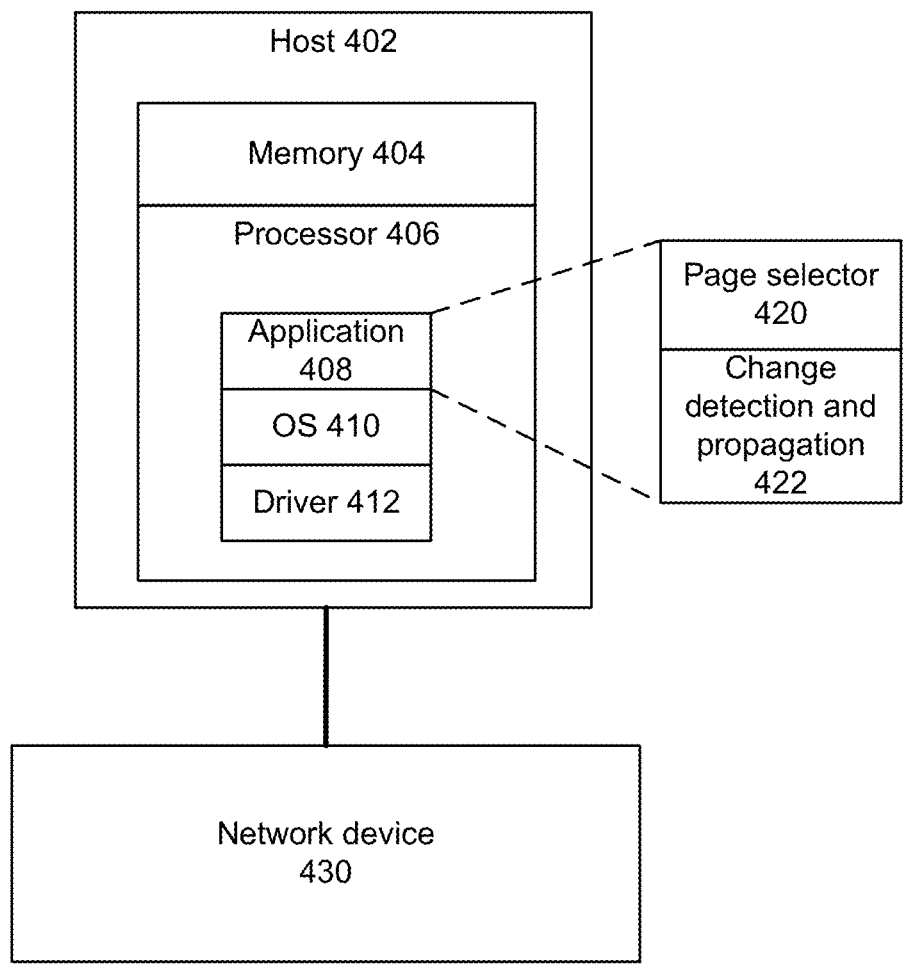
FIG. 4 depicts an example system.

FIG. 4 depicts an example system in which a host can perform monitoring and remediation actions. Host 402 can execute application 408, which can perform page selection, change detection, and replication. For example, page selection 420 can identify a baseline copy (e.g., a read-only baseline) and an updated copy of a selected page. When a timer is completed or another condition is reached, change detection and replication 422 can determine a difference between the baseline and updated copy and the difference propagated at the request of software running on host 402. After a second, larger time, page ownership can be released so that the likelihood of running into a contending write access reduces.

Figure 5:
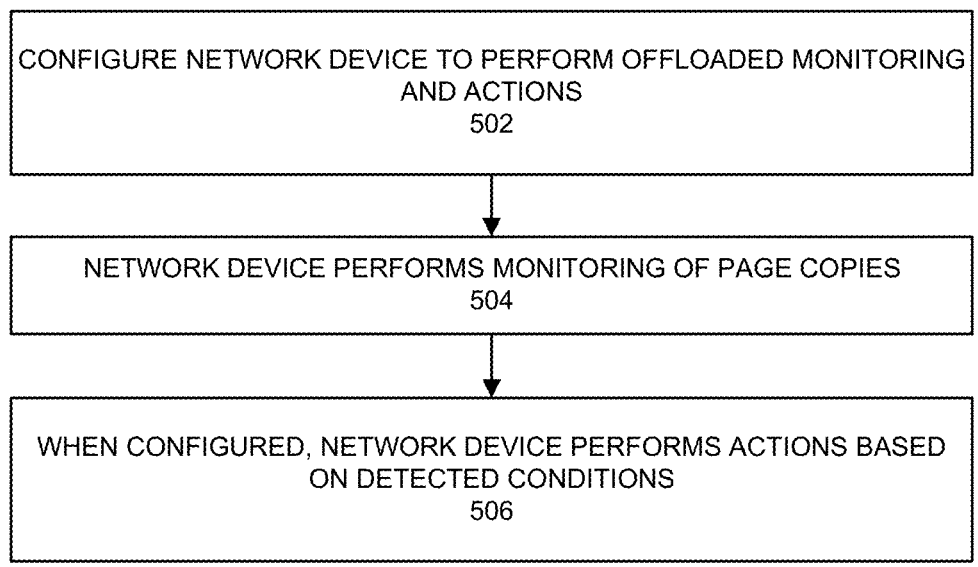
FIG. 5 depicts an example process.

FIG. 5 depicts an example process. The process can be performed by a node to offload data copy operations and perform remediation operations. At 502, a network device can be configured to perform monitoring of a data copy operation within a DSM and remediation operations for one or more particular conditions being met. For example, an OS or driver can configure the network device to perform monitoring of a data copy operation within a DSM and remediation operations in response to one or more particular conditions being met.

At 504, the network device can perform monitoring of page copies. For example, a frequency of page copies among nodes in a DSM can be monitored. At 506, based on programming of a remedial action related to a frequency of page copies, the network device can perform a remedial action. Remedial actions can include one or more of: slice (reduce data copy size), de-duplicate data, merge pages or regions of memory, transfer data to a node that accesses the data the most, creating multiple data replicas and merging them periodically, and so forth.

Figure 6:
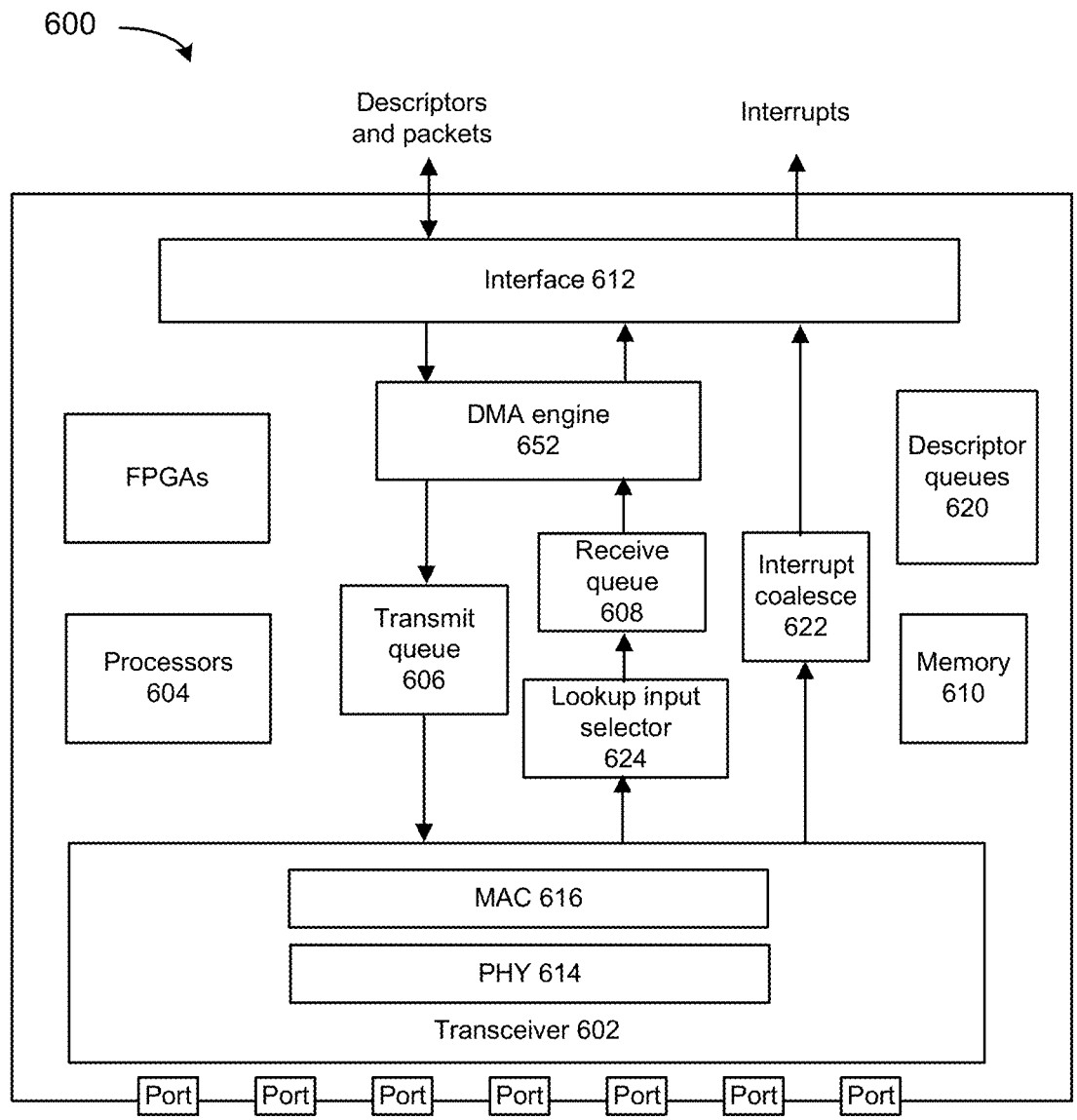
FIG. 6 depicts an example network interface.

FIG. 6 depicts a network interface that can perform data copy monitoring and selective remediation actions to reduce data copy operations. In some examples, network interface 600 can be implemented as a network interface controller, network interface card, a host fabric interface (HFI), or host bus adapter (HBA), and such examples can be interchangeable. Network interface 600 can be coupled to one or more servers using a bus, PCIe, CXL, or DDR. Network interface 600 may be embodied as part of a system-on-a-chip (SoC) that includes one or more processors, or included on a multichip package that also contains one or more processors.

Some examples of network device 600 are part of an Infrastructure Processing Unit (IPU) or data processing unit (DPU) or utilized by an IPU or DPU. An IPU or DPU can include a network interface with one or more programmable or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 600 can include transceiver 602, processors 604, transmit queue 606, receive queue 608, memory 610, and bus interface 612, and DMA engine 652. Transceiver 602 can be capable of receiving and transmitting packets in conformance with the applicable protocols such as Ethernet as described in IEEE 802.3, although other protocols may be used. Transceiver 602 can receive and transmit packets from and to a network via a network medium (not depicted). Transceiver 602 can include PHY circuitry 614 and media access control (MAC) circuitry 616. PHY circuitry 614 can include encoding and decoding circuitry (not shown) to encode and decode data packets according to applicable physical layer specifications or standards. MAC circuitry 616 can be configured to perform MAC address filtering on received packets, process MAC headers of received packets by verifying data integrity, remove preambles and padding, and provide packet content for processing by higher layers. MAC circuitry 616 can be configured to assemble data to be transmitted into packets, that include destination and source addresses along with network control information and error detection hash values.

Processors 604 can be any a combination of a: processor, core, graphics processing unit (GPU), field programmable gate array (FPGA), application specific integrated circuit (ASIC), programmable packet processing pipelines, or other programmable hardware device that allow programming of network interface 600. For example, a "smart network interface" or SmartNIC can provide packet processing capabilities in the network interface using processors 604.

Packet allocator 624 can provide distribution of received packets for processing by multiple CPUs or cores using timeslot allocation described herein or RSS. When packet allocator 624 uses RSS, packet allocator 624 can calculate a hash or make another determination based on contents of a received packet to determine which CPU or core is to process a packet.

Interrupt coalesce 622 can perform interrupt moderation whereby network interface interrupt coalesce 622 waits for multiple packets to arrive, or for a time-out to expire, before generating an interrupt to host system to process received packet(s). Receive Segment Coalescing (RSC) can be performed by network interface 600 whereby portions of incoming packets are combined into segments of a packet. Network interface 600 provides this coalesced packet to an application.

Direct memory access (DMA) engine 652 can copy a packet header, packet payload, and/or descriptor directly from host memory to the network interface or vice versa, instead of copying the packet to an intermediate buffer at the host and then using another copy operation from the intermediate buffer to the destination buffer. In some examples, DMA engine 652 can be integrated into a processor to copy data to/from volatile memory, persistent memory, and/or memory-mapped I/O (MMIO) to/from remote volatile and persistent memory on another node in a cluster. DMA engine 652 can perform one or more features of Intel® data streaming accelerator (DSA).

Memory 610 can be any type of volatile or non-volatile memory device and can store any queue or instructions used to program network interface 600. Transmit queue 606 can include data or references to data for transmission by network interface. Receive queue 608 can include data or references to data that was received by network interface from a network. Descriptor queues 620 can include descriptors that reference data or packets in transmit queue 606 or receive queue 608. Bus interface 612 can provide an interface with host device (not depicted). For example, bus interface 612 can be compatible with PCI, PCI Express, PCI-x, Serial ATA, and/or USB compatible interface (although other interconnection standards may be used).

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, edge servers and switches, fog network elements, and/or hybrid data centers (e.g., data center that use virtualization, cloud and software-defined networking to deliver application workloads across physical data centers and distributed multi-cloud environments).

Figure 7:
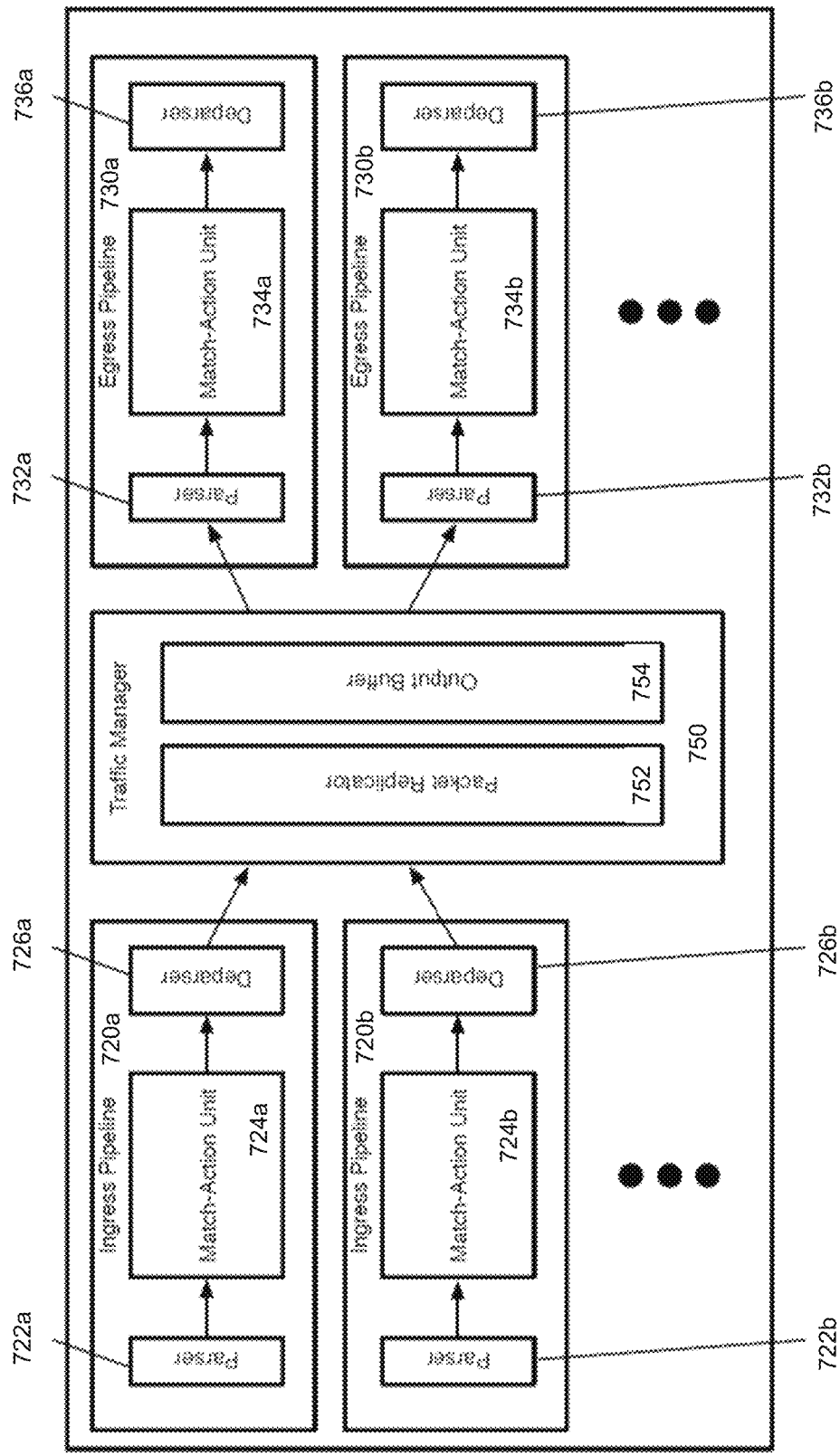
FIG. 7 depicts an example packet processing pipeline.

FIG. 7 depicts an example network forwarding system that can be used in a network device to perform monitoring and remediation as well as other activities described herein. For example, FIG. 7 illustrates several ingress pipelines 720, a traffic management unit (referred to as a traffic manager) 750, and several egress pipelines 730. Though shown as separate structures, in some embodiments the ingress pipelines 720 and the egress pipelines 730 can use the same circuitry resources. In some embodiments, the pipeline circuitry is configured to process ingress and/or egress pipeline packets synchronously, as well as non-packet data. That is, a particular stage of the pipeline may process any combination of an ingress packet, an egress packet, and non-packet data in the same clock cycle. However, in other embodiments, the ingress and egress pipelines are separate circuitry. In some of these other embodiments, the ingress pipelines also process the non-packet data.

In some examples, in response to receiving a packet, the packet is directed to one of the ingress pipelines 720 where an ingress pipeline which may correspond to one or more ports of a hardware forwarding element. After passing through the selected ingress pipeline 720, the packet is sent to the traffic manager 750, where the packet is enqueued and placed in the output buffer 754. In some embodiments, the ingress pipeline 720 that processes the packet specifies into which queue the packet is to be placed by the traffic manager 750 (e.g., based on the destination of the packet or a flow identifier of the packet). The traffic manager 750 then dispatches the packet to the appropriate egress pipeline 730 where an egress pipeline may correspond to one or more ports of the forwarding element. In some embodiments, there is no necessary correlation between which of the ingress pipelines 720 processes a packet and to which of the egress pipelines 730 the traffic manager 750 dispatches the packet. That is, a packet might be initially processed by ingress pipeline 720*b* after receipt through a first port, and then subsequently by egress pipeline 730*a* to be sent out a second port, etc.

A least one ingress pipeline 720 includes a parser 722, a match-action unit (MAU) 724, and a deparser 726. Similarly, egress pipeline 730 can include a parser 732, a MAU 734, and a deparser 736. The parser 722 or 732, in some embodiments, receives a packet as a formatted collection of bits in a particular order, and parses the packet into its constituent header fields. In some examples, the parser starts from the beginning of the packet and assigns header fields to fields (e.g., data containers) for processing. In some embodiments, the parser 722 or 732 separates out the packet headers (up to a designated point) from the payload of the packet, and sends the payload (or the entire packet, including the headers and payload) directly to the deparser without passing through the MAU processing.

The MAU 724 or 734 can perform processing on the packet data. In some embodiments, the MAU includes a sequence of stages, with each stage including one or more match tables and an action engine. A match table can include a set of match entries against which the packet header fields are matched (e.g., using hash tables), with the match entries referencing action entries. When the packet matches a particular match entry, that particular match entry references a particular action entry which specifies a set of actions to perform on the packet (e.g., sending the packet to a particular port, modifying one or more packet header field values, dropping the packet, mirroring the packet to a mirror buffer, etc.). The action engine of the stage can perform the actions on the packet, which is then sent to the next stage of the MAU. For example, using MAU, telemetry data for the forwarding element can be gathered and sent to another network device, switch, router, or endpoint receiver or transmitter in one or more packets. MAU 724 or 734 can perform monitoring and/or remediation as described herein.

The deparser 726 or 736 can reconstruct the packet using the PHV as modified by the MAU 724 or 734 and the payload received directly from the parser 722 or 732. The deparser can construct a packet that can be sent out over the physical network, or to the traffic manager 750. In some embodiments, the deparser can construct this packet based on data received along with the PHV that specifies the protocols to include in the packet header, as well as its own stored list of data container locations for each possible protocol's header fields.

Traffic manager 750 can include a packet replicator 752 and output buffer 754. In some embodiments, the traffic manager 750 may include other components, such as a feedback generator for sending signals regarding output port failures, a series of queues and schedulers for these queues, queue state analysis components, as well as additional components. The packet replicator 752 of some embodiments performs replication for broadcast/multicast packets, generating multiple packets to be added to the output buffer (e.g., to be distributed to different egress pipelines).

The output buffer 754 can be part of a queuing and buffering system of the traffic manager in some embodiments. The traffic manager 750 can provide a shared buffer that accommodates any queuing delays in the egress pipelines. In some embodiments, this shared output buffer 754 can store packet data, while references (e.g., pointers) to that packet data are kept in different queues for each egress pipeline 730. The egress pipelines can request their respective data from the common data buffer using a queuing policy that is control-plane configurable. When a packet data reference reaches the head of its queue and is scheduled for dequeuing, the corresponding packet data can be read out of the output buffer 754 and into the corresponding egress pipeline 730. In some embodiments, packet data may be referenced by multiple pipelines (e.g., for a multicast packet). In this case, the packet data is not removed from this output buffer 754 until references to the packet data have cleared their respective queues.

Figure 8:
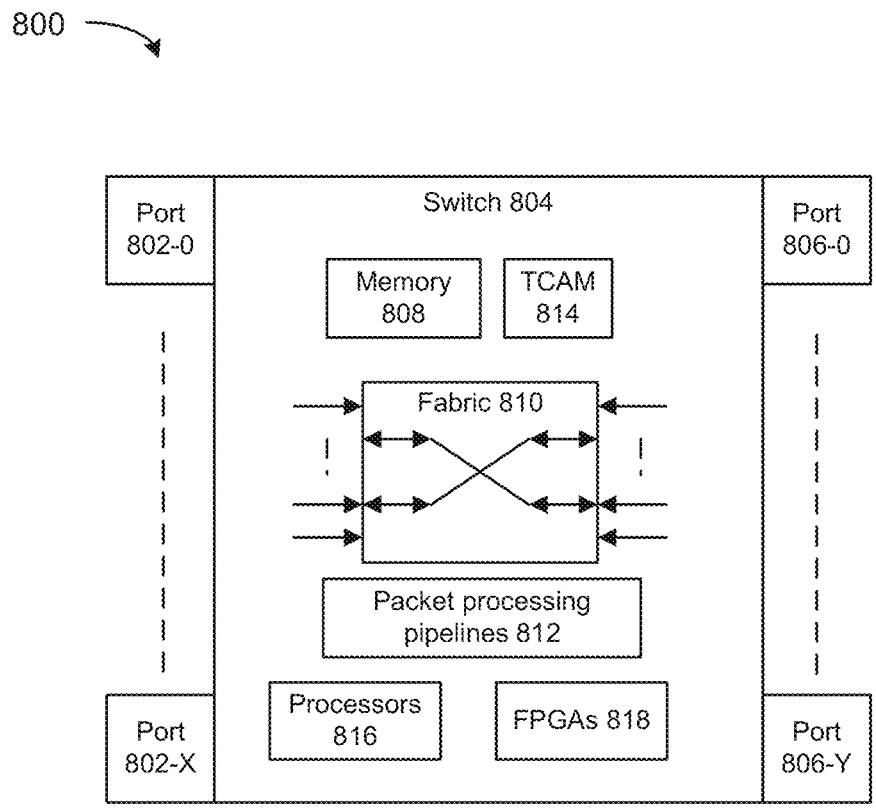
FIG. 8 depicts an example switch.

FIG. 8 depicts an example system that can be used in a switch implementation of a network device to perform monitoring and remediation as well as other activities described herein. Various resources in the switch (e.g., packet processing pipelines 812, processors 816, and/or FPGAs 818) can perform data replication as described herein. Switch 804 can route packets or frames of any format or in accordance with any specification from any port 802-0 to 802-X to any of ports 806-0 to 806-Y (or vice versa). Any of ports 802-0 to 802-X can be connected to a network of one or more interconnected devices. Similarly, any of ports 806-0 to 806-X can be connected to a network of one or more interconnected devices.

In some examples, switch fabric 810 can provide routing of packets from one or more ingress ports for processing prior to egress from switch 804. Switch fabric 810 can be implemented as one or more multi-hop topologies, where example topologies include torus, butterflies, buffered multi-stage, etc., or shared memory switch fabric (SMSF), among other implementations. SMSF can be any switch fabric connected to ingress ports and all egress ports in the switch, where ingress subsystems write (store) packet segments into the fabric's memory, while the egress subsystems read (fetch) packet segments from the fabric's memory.

Memory 808 can be configured to store packets received at ports prior to egress from one or more ports. Packet processing pipelines 812 can determine which port to transfer packets or frames to using a table that maps packet characteristics with an associated output port. Packet processing pipelines 812 can be configured to perform match-action on received packets to identify packet processing rules and next hops using information stored in a ternary content-addressable memory (TCAM) tables or exact match tables in some embodiments. For example, match-action tables or circuitry can be used whereby a hash of a portion of a packet is used as an index to find an entry. Packet processing pipelines 812 can implement access control list (ACL) or packet drops due to queue overflow. Packet processing pipelines 812 can be configured to add operation and telemetry data concerning switch 804 to a packet prior to its egress. Packet processing pipelines 812 can perform monitoring and/or remediation as described herein.

Configuration of operation of packet processing pipelines 812, including its data plane, can be programmed using P4, C, Python, Broadcom Network Programming Language (NPL), or x86 compatible executable binaries or other executable binaries. Processors 816 and FPGAs 818 can be utilized for packet processing or modification.

Figure 9:
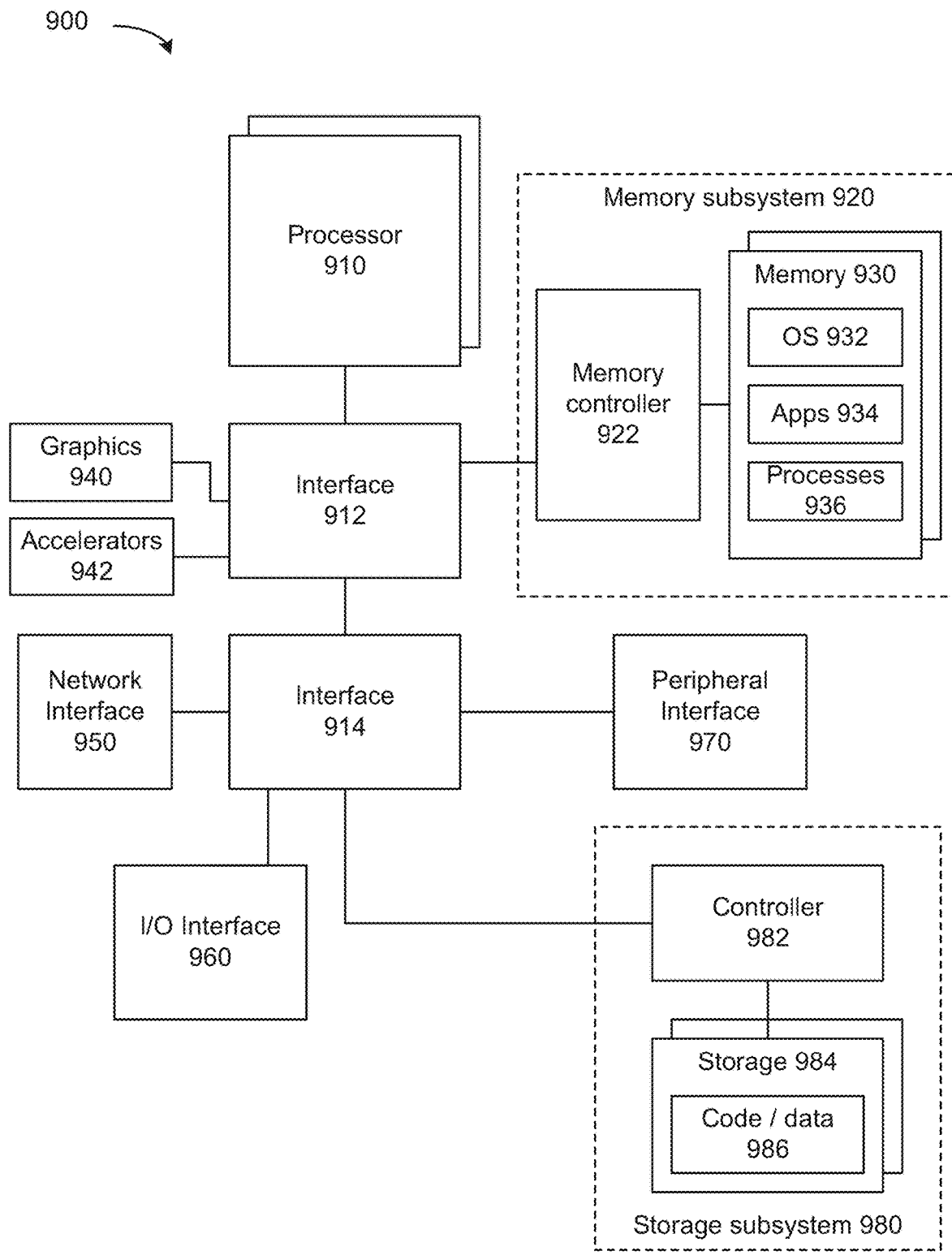
FIG. 9 depicts an example system.

FIG. 9 depicts an example computing system. One or more components of system 900 can be used to perform monitoring and/or remediation as well as other activities described herein. System 900 includes processor 910, which provides processing, operation management, and execution of instructions for system 900. Processor 910 can include any type of microprocessor, central processing unit (CPU), graphics processing unit (GPU), vision processing unit (VPU), processing core, or other processing hardware to provide processing for system 900, or a combination of processors. Note that reference to GPU or CPU herein can in addition or alternatively refer to an XPU or xPU. An xPU can include one or more of: a GPU, ASIC, FPGA, or accelerator device. Processor 910 controls the overall operation of system 900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 900 includes interface 912 coupled to processor 910, which can represent a higher speed interface or a high throughput interface for system components that needs higher bandwidth connections, such as memory subsystem 920 or graphics interface components 940, or accelerators 942. Interface 912 represents an interface circuit, which can be a standalone component or integrated onto a processor die. Where present, graphics interface 940 interfaces to graphics components for providing a visual display to a user of system 900. In one example, graphics interface 940 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 940 generates a display based on data stored in memory 930 or based on operations executed by processor 910 or both. In one example, graphics interface 940 generates a display based on data stored in memory 930 or based on operations executed by processor 910 or both.

Accelerators 942 can be a fixed function or programmable offload engine that can be accessed or used by a processor 910. For example, an accelerator among accelerators 942 can provide compression (DC) capability, cryptography services such as public key encryption (PKE), cipher, hash/authentication capabilities, decryption, or other capabilities or services. In some embodiments, in addition or alternatively, an accelerator among accelerators 942 provides field select controller capabilities as described herein. In some cases, accelerators 942 can be integrated into a CPU socket (e.g., a connector to a motherboard or circuit board that includes a CPU and provides an electrical interface with the CPU). For example, accelerators 942 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 942 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 920 represents the main memory of system 900 and provides storage for code to be executed by processor 910, or data values to be used in executing a routine. Memory subsystem 920 can include one or more memory devices 930 such as read-only memory (ROM), flash memory, one or more varieties of random access memory (RAM) such as DRAM, or other memory devices, or a combination of such devices. Memory 930 stores and hosts, among other things, operating system (OS) 932 to provide a software platform for execution of instructions in system 900. Additionally, applications 934 can execute on the software platform of OS 932 from memory 930. Applications 934 represent programs that have their own operational logic to perform execution of one or more functions. Processes 936 represent agents or routines that provide auxiliary functions to OS 932 or one or more applications 934 or a combination. OS 932, applications 934, and processes 936 provide software logic to provide functions for system 900. In one example, memory subsystem 920 includes memory controller 922, which is a memory controller to generate and issue commands to memory 930. It will be understood that memory controller 922 could be a physical part of processor 910 or a physical part of interface 912. For example, memory controller 922 can be an integrated memory controller, integrated onto a circuit with processor 910.

In some examples, OS 932 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others. OS or driver can configure network interface 950 to perform data copy monitoring and/or one or more remediation action(s).

While not specifically illustrated, it will be understood that system 900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 900 includes interface 914, which can be coupled to interface 912. In one example, interface 914 represents an interface circuit, which can include standalone components and integrated circuitry. In one example, multiple user interface components or peripheral components, or both, couple to interface 914. Network interface 950 provides system 900 the ability to communicate with remote devices (e.g., servers or other computing devices) over one or more networks. Network interface 950 can include an Ethernet adapter, wireless interconnection components, cellular network interconnection components, USB (universal serial bus), or other wired or wireless standards-based or proprietary interfaces. Network interface 950 can transmit data to a device that is in the same data center or rack or a remote device, which can include sending data stored in memory. Network interface 950 can receive data from a remote device, which can include storing received data into memory. Various embodiments can be used in connection with network interface 950, processor 910, and memory subsystem 920. Various embodiments of network interface 950 use embodiments described herein to receive or transmit timing related signals and provide protection against circuit damage from misconfigured port use while providing acceptable propagation delay.

In one example, system 900 includes one or more input/output (I/O) interface(s) 960. I/O interface 960 can include one or more interface components through which a user interacts with system 900 (e.g., audio, alphanumeric, tactile/touch, or other interfacing). Peripheral interface 970 can include any hardware interface not specifically mentioned above. Peripherals refer generally to devices that connect dependently to system 900. A dependent connection is one where system 900 provides the software platform or hardware platform or both on which operation executes, and with which a user interacts.

In one example, system 900 includes storage subsystem 980 to store data in a nonvolatile manner. In one example, in certain system implementations, at least certain components of storage 980 can overlap with components of memory subsystem 920. Storage subsystem 980 includes storage device(s) 984, which can be or include any conventional medium for storing large amounts of data in a nonvolatile manner, such as one or more magnetic, solid state, or optical based disks, or a combination. Storage 984 holds code or instructions and data 986 in a persistent state (e.g., the value is retained despite interruption of power to system 900). Storage 984 can be generically considered to be a "memory," although memory 930 is typically the executing or operating memory to provide instructions to processor 910. Whereas storage 984 is nonvolatile, memory 930 can include volatile memory (e.g., the value or state of the data is indeterminate if power is interrupted to system 900). In one example, storage subsystem 980 includes controller 982 to interface with storage 984. In one example controller 982 is a physical part of interface 914 or processor 910 or can include circuits or logic in both processor 910 and interface 914.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory includes a cache. A memory subsystem as described herein may be compatible with a number of memory technologies, such as DDR3 (Double Data Rate version 3, original release by JEDEC (Joint Electronic Device Engineering Council) on Jun. 16, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 900. More specifically, power source typically interfaces to one or multiple power supplies in system 900 to provide power to the components of system 900. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 900 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade can include components common to conventional servers, including a main printed circuit board (main board) providing internal wiring (e.g., buses) for coupling appropriate integrated circuits (ICs) and other components mounted to the board. Embodiments can be implemented using one or more micro servers or application-defined servers whereby a system on chip (SoC) integrates components compute and I/O operations.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, edge servers, edge switches, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or combination thereof, including "X, Y, and/or Z.'"

Illustrative examples of the devices, systems, and methods disclosed herein are provided below. An embodiment of the devices, systems, and methods may include one or more, and combination of, the examples described below.

Example 1 includes one or more examples and includes an apparatus comprising: a network interface device comprising: a device interface; input/output circuitry to receive Ethernet compliant packets and output Ethernet compliant packets; circuitry to monitor a particular page for a rate of data copying among nodes within a group of two or more nodes; and circuitry to perform one or more actions based, at least in part, on the rate of data copying among the nodes within the group of two or more nodes to attempt to reduce a number of copy operations of the data among the nodes within the group of two or more nodes, wherein the group of two or more nodes are part of a distributed shared memory (DSM).

Example 2 includes one or more examples, wherein the one or more actions comprise copy the data to a node that is a fewer number of hops away from a node that accesses the data.

Example 3 includes one or more examples, wherein the one or more actions comprise split the particular page of data into smaller ranges to reduce a size of data copied.

Example 4 includes one or more examples, wherein the one or more actions comprise selection of a coordinator node to manage one or more updates to data stored in the particular page and to provide a true copy of the data in the particular page.

Example 5 includes one or more examples, wherein the one or more actions comprise migration of an accessor of data to execute on a target node within the group of two or more nodes and wherein the target node stores data accessed by the accessor of data.

Example 6 includes one or more examples, wherein the network interface device is part of a cluster of network devices wherein applications execute on multiple processors and access data from logically shared memory and wherein the accessed data is physically distributed across memory devices over a scale-out network.

Example 7 includes one or more examples, wherein the network interface device comprises one or more of: a network interface controller (NIC), a SmartNIC, infrastructure processing unit (IPU), switch, and/or switch with programmable packet processing pipeline.

Example 8 includes one or more examples, and includes a host node coupled to the device interface, wherein the host node comprises: at least one memory device and at least one processor to execute an application that is to access data stored within the group of two or more nodes, wherein the group of two or more nodes are consistent with a DSM model.

Example 9 includes one or more examples, and includes a method comprising: a network device monitoring a particular address range for a rate of data copying among nodes within a group of two or more nodes and the network device performing one or more actions based, at least in part, on the rate of data copying among the nodes within the group of two or more nodes.

Example 10 includes one or more examples, wherein the one or more actions comprise copy the data to a node that is a fewer number of hops away from a node that accesses the data.

Example 11 includes one or more examples, wherein the one or more actions comprise split the particular address range of data into smaller ranges to reduce a size of data copied.

Example 12 includes one or more examples, wherein the one or more actions comprise selection of a coordinator node to manage one or more updates to data stored in the particular address range and to provide a true copy of the data in the particular address range.

Example 13 includes one or more examples, wherein the one or more actions comprise migration of an accessor of data to execute on a target node within the group of two or more nodes and wherein the target node stores data accessed by the accessor of data.

Example 14 includes one or more examples, wherein the network device is part of a cluster of network devices wherein applications execute on multiple processors and access data from logically shared memory and wherein the accessed data is physically distributed across memory devices over a scale-out network.

Example 15 includes one or more examples, and includes at least one non-transitory computer-readable medium comprising instructions stored thereon, that if executed by one or more processors, cause the one or more processors to: configure a network device to monitor a particular address range for a rate of data copying among nodes within a group of two or more nodes and perform one or more actions based, at least in part, on the rate of data copying among the nodes within the group of two or more nodes.

Example 16 includes one or more examples, wherein the one or more actions comprise copy the data to a node that is a fewer number of hops away from a node that accesses the data.

Example 17 includes one or more examples, wherein the one or more actions comprise split the particular address range of data into smaller ranges to reduce a size of data copied.

Example 18 includes one or more examples, wherein the one or more actions comprise migration of an accessor of data to execute on a target node within the group of two or more nodes and wherein the target node stores data accessed by the accessor of data.

Example 19 includes one or more examples, wherein the one or more actions comprise selection of a coordinator node to manage one or more updates to data stored in the particular address range and to provide a true copy of the data in the particular address range.

Example 20 includes one or more examples, wherein an orchestrator, driver, and/or operating system (OS) is to configure the network device.

Example 21 includes one or more examples, wherein the network device comprises one or more of: a network interface controller (NIC), a SmartNIC, infrastructure processing unit (IPU), switch, and/or switch with programmable packet processing pipeline.

The invention claimed is:

1. An apparatus comprising:
a network interface device comprising:
a device interface;
input/output circuitry to receive Ethernet compliant packets and transmit Ethernet compliant packets;
circuitry to monitor copying of a particular page of data among nodes within a group of two or more nodes based on heatmap data indicative of copying activity of the particular page of data among the group of two or more nodes; and
circuitry to perform one or more actions based, at least in part, on the data copying activity among the nodes within the group of two or more nodes based on the heatmap data to attempt to reduce a number of copy operations of the particular page of data among the nodes within the group of two or more nodes, wherein the group of two or more nodes are part of a distributed shared memory (DSM) and wherein the one or more actions comprise migration of an accessor process that is to access the particular page of data to execute on a target node within the group of two or more nodes and wherein the target node is to store the particular page of data accessed by the accessor process of the data.

2. The apparatus of claim 1, wherein the one or more actions comprise create multiple replicas of the particular page of data and defer merge of the particular page of data.

3. The apparatus of claim 1, wherein the one or more actions comprise split the particular page of data into smaller ranges to reduce a size of data copied.

4. The apparatus of claim 1, wherein the one or more actions comprise selection of a coordinator node to manage one or more updates to the particular page of data and to provide an up-to-date copy of the data in the particular page.

5. The apparatus of claim 1, wherein the network interface device is part of a cluster of network devices wherein applications execute on multiple processors of the network devices and access data from logically shared memory and wherein the accessed data is physically distributed across memory devices over a scale-out network.

6. The apparatus of claim 1, wherein the network interface device comprises one or more of: a network interface controller (NIC), a SmartNIC, infrastructure processing unit (IPU), switch, and/or switch with programmable packet processing pipeline.

7. The apparatus of claim 1, comprising a host node coupled to the device interface, wherein the host node comprises:
at least one memory device and
at least one processor to execute an application that is to access the particular page of data stored within the group of two or more nodes, wherein the group of two or more nodes are consistent with a DSM model.

8. The apparatus of claim 1, wherein the network interface device is to receive the heat map data in one or more packets.

9. A method comprising:
a network interface device monitoring a particular address range for a rate of data copying among nodes within a group of two or more nodes based on heatmap data indicative of copying activity of the particular address range of data among the group of two or more nodes, wherein the network interface device comprises: a network interface to receive and transmit packets and a host interface and
the network interface device performing one or more actions based, at least in part, on the rate of data copying among the nodes within the group of two or more nodes, wherein the one or more actions comprise migration of an accessor to execute on a target node within the group of two or more nodes and wherein, after migration of the accessor to execute on the target node, the target node stores data associated with the particular address range accessed by the accessor and the target node executes the accessor.

10. The method of claim 9, wherein the one or more actions comprise copy the data to a node that is a fewer number of hops away from a node that accesses the data.

11. The method of claim 9, wherein the one or more actions comprise split the particular address range of data into smaller ranges to reduce a transmitted size of data associated with the particular address range.

12. The method of claim 9, wherein the one or more actions comprise selection of a coordinator node to manage one or more updates to data stored in the particular address range and to provide an up-to-date copy of the data in the particular address range.

13. The method of claim 9, wherein the network interface device is part of a cluster of network devices wherein applications execute on multiple processors of the network devices and access data from logically shared memory and wherein the accessed data is physically distributed across memory devices over a scale-out network.

14. At least one non-transitory computer-readable medium comprising instructions stored thereon, that if executed by one or more processors, cause the one or more processors to:
configure a network interface device to monitor a particular address range for a rate of data copying among nodes within a group of two or more nodes based on heatmap data indicative of the rate of data copying activity of the particular address range of data among the group of two or more nodes, wherein the network interface device comprises: a network interface to receive and transmit packets and a host interface and
configure the network interface device to perform one or more actions based, at least in part, on the rate of data copying among the nodes within the group of two or more nodes, wherein the one or more actions comprise migration of an application to execute on a target node within the group of two or more nodes and wherein, after migration of the application to execute on the target node, the target node stores data associated with the particular address range accessed by the application and the target node executes the application and wherein the application comprises one or more of: a virtual machine (VM), container, service, microservice, or executable binary.

15. The computer-readable medium of claim 14, wherein the one or more actions comprise copy the data to a node that is a fewer number of hops away from a node that accesses the data.

16. The computer-readable medium of claim 14, wherein the one or more actions comprise split the particular address range of data into smaller ranges to reduce a transmitted size of data associated with the particular address range.

17. The computer-readable medium of claim 14, wherein the one or more actions comprise selection of a coordinator node to manage one or more updates to the data stored in the particular address range and to provide a true copy of the data in the particular address range.

18. The computer-readable medium of claim 14, wherein an orchestrator, driver, and/or operating system (OS) is to configure the network interface device.

\* \* \* \* \*